United States Patent [19]

Langer

[11] Patent Number: 4,639,984
[45] Date of Patent: Feb. 3, 1987

[54] GUIDE TRACK FOR A TENTERING CHAIN

[75] Inventor: Rudolf Langer, Lindau, Fed. Rep. of Germany

[73] Assignee: Lindauer Dornier Gesellschaft mbH, Lindau/Bodensee, Fed. Rep. of Germany

[21] Appl. No.: 799,403

[22] Filed: Nov. 19, 1985

[30] Foreign Application Priority Data

Dec. 1, 1984 [DE] Fed. Rep. of Germany ....... 3443905

[51] Int. Cl.$^4$ .............................................. D06C 3/02
[52] U.S. Cl. .......................................... 26/89; 26/91; 26/94
[58] Field of Search .................... 26/91, 72, 73, 89, 86, 26/92, 96, 94, 93

[56] References Cited

U.S. PATENT DOCUMENTS

| | | | |
|---|---|---|---|
| 2,002,096 | 5/1935 | McCann, Jr. | 26/93 |
| 2,755,533 | 7/1956 | Miller | 26/91 X |
| 3,150,433 | 9/1964 | Kampf | 26/94 X |
| 3,264,704 | 8/1966 | Prottengeier | 26/91 |
| 3,457,608 | 7/1969 | Gageur . | |
| 4,065,838 | 1/1978 | Jungpeter et al. | 26/94 |
| 4,435,884 | 3/1984 | Bosch | 26/93 |

FOREIGN PATENT DOCUMENTS

| | | |
|---|---|---|
| 1460640 | 1/1973 | Fed. Rep. of Germany . |
| 1303870 | 12/1973 | Fed. Rep. of Germany . |
| 47-24187 | 4/1972 | Japan .................................. 26/92 |
| 1013627 | 12/1965 | United Kingdom .................... 26/73 |

*Primary Examiner*—Robert R. Mackey
*Attorney, Agent, or Firm*—W. G. Fasse; D. H. Kane, Jr.

[57] ABSTRACT

A guide track for a tentering chain carrying tentering clamps supports the clamps by a number of rollers to form a tentering frame, especially for a film stretching machine. The guide track is an endless track with U-turns in which a single semicircle type of U-turn has been replaced by a U-turn including two partial curved sections each having a smaller radius of curvature and the two curved sections are interconnected by a straight intermediate section. The reversing or looping curved section at the beginning of the reverse run is so constructed that at this location a drive sprocket wheel can mesh with the tentering chain. Thus, the drive sprocket which was a source of contamination for the web is located remote from the web to thereby substantially reduce any possibilities of contaminating the web.

19 Claims, 4 Drawing Figures

GUIDE TRACK FOR A TENTERING CHAIN

FIELD OF THE INVENTION

The invention relates to a guide track for a tentering chain carrying tentering members such as clamps or hooks. More specifically, the tentering clamps comprise rollers forming carriers or bearings for supporting the clamps forming a chain in a tentering frame. Such guide tracks are especially suitable for so-called film stretching machines. The guide track is made of guide rails forming a forward run or section, a reverse run or section, and two U-turn bends interconnecting the forward and reverse sections to form an endless guide track.

DESCRIPTION OF THE PRIOR ART

One type of conventional guide track for tentering chains comprises rigid guide rail sections which are mounted in place with a gap between adjacent rail sections. These gaps disturb the smooth run of the rollers carrying the tentering clamps. Another type of conventional guide track for tentering chains comprises endless flexible or bendable guide rails. Such rails are preferable to the rigid rails because they assure a smooth run for the rollers carrying the tentering clamps.

A guide track for an endless tentering chain is known, for example, from German Patent (DE-PS) No. 1,303,870 disclosing a track construction comprising a package of spring steel belts or tapes. These spring steel tapes or belts are clamped in place in an upright or on-edge position to form chain carrier rail sections. The tentering chain is equipped with running rollers which contact the package of spring steel belts or tapes on both sides, whereby any occurring horizontal forces are taken up. Further carrier rollers also forming part of the tentering chain are arranged to run on the narrow edge of the package of spring steel belts or tapes for taking up any vertical forces, especially the weight of the tentering chain formed by the tentering clamps.

German Patent (DE-PS) No. 1,460,640 discloses a guide track for a tentering chain in which the guide rails are uninterrupted at one of the U-turns between the forward and reverse runs, and wherein a drive sprocket is mounted at the other U-turn. The drive sprocket meshes with the tentering chain or directly with the tentering clamps forming the tentering chain.

In connection with the driving of tentering chains for textile or film tentering frames, it is known to arrange sprocket wheels at both U-turns, that is, at the beginning and at the end of the chain track. Generally, one drive sprocket wheel is arranged at the outlet end for each chain track. The arrangement is such that the tentering chains are guided tangentially through the chain tracks toward the sprocket wheels, whereby these sprocket wheels provide for a 180° U-turn provided that the forward and reverse runs extend in parallel to each other in the inlet and outlet zone of the tentering frame or other treatment chamber. It is also general practice to pass the forward and reverse sections or runs through a housing which also encloses the heat treatment chamber.

Such an apparatus has the advantage of relatively small dimensions for the drive sprocket wheels resulting in small torque moments for high loads. However, such a conventional apparatus has simultaneously the disadvantage that the maximum material or film advance speed is limited because the sprocket wheels with the relatively small diameter cause a so-called polygon effect which impairs a smooth run of the tentering chain. The polygon effect may be understood by assuming that the sprocket wheel is a polygon having relatively few sides. As a result, such sprocket wheels with a small diameter cause a chain movement which is not sufficiently smooth. Additionally, it is necessary in this prior art arrangement that the tentering chain must be transferred at both U-turns from the guide track to the sprocket wheel and back from the sprocket wheel into the guide track. This transfer negatively influences the quiet running of the chains and limits the maximum operational speed of the chains.

Another conventional arrangement requires turning the tentering chains for more than 180° in the driving zone and in the forward turning zone of the sprocket wheels, whereby the wheel diameter must be increased and the guide tracks must diverge from the last guide points toward the respective sprocket wheel in the inlet and outlet zone so that both chain guides for the forward and reverse run are located relatively closely to each other for leading these runs through the housing of the treatment chamber. This type of arrangement permits larger operational speeds for the chains due to the larger diameter of the sprocket wheels. However, the inlet zone and the outlet zone require relatively long dimensions due to the above mentioned divergent or convergent return run of the outwardly located reverse section of the guide track. The divergent or convergent run is defined relative to the next guide point near the respective sprocket wheel.

Efforts have been made heretofore to increase the travel speed of the chain while simultaneously assuring a quiet run and reducing the shocks that are caused by the transfer of the tentering chain from the guide tracks to the sprocket wheels and vice versa, by using very large diameters for the drive sprocket wheels and providing these wheels with a respectively high number of teeth. By these features it is possible to reduce the above mentioned disadvantageous polygon effect. Additionally, machines with large diameter drive sprocket wheels have the advantage that the guide tracks for the return run of the tentering chain may be arranged outside of the housing of the treatment chamber. Such arrangement in turn has the substantial advantage that the return run is easily accessible for maintenance work and for cooling the return run or reverse run of the tentering chain.

However, large diameter sprocket wheels also have the disadvantage that only a limited adjustment range is available for the inwardly located tentering chain tracks. Stated differently, the adjustment range between the maximum and minimum width of the fabric or film at the inlet and outlet ends is limited. An additional disadvantage of large diameter sprocket wheels in this context is seen in the fact that the closing and opening point of the tentering clamps is not easily accessible for maintenance work, for example. As a result, respectively large spacings are required for the mounting of fabric or film guide rollers or take up rollers at the inlet and outlet ends of the apparatus.

Another disadvantage of prior art machines with sprocket wheels is seen in that the sprocket wheels are located at least partially in the material supply zone of the tentering or transport chains of the tentering clamps, whereby a source of contamination is provided due to wear and tear of the sprocket wheel and chain in the just mentioned zone and due to oil and grease required for lubricating the sprocket wheel. Such contaminations are unacceptable for the fabric and also for any film material.

In connection with very large diameter sprocket wheels there is the further disadvantage that relatively long sections of the tentering or transport chain rest on the toothed rim of the sprocket wheel causing a relative longitudinal movement between the tentering chain and the sprocket wheel when the chain is in motion. Such relative motion occurs even if only a small change in length of the clamp spacing is present. Such a relatively small change in length is unavoidable due to wear and tear in operation. This relative longitudinal motion even increases the wear and tear, thereby causing dust which in turn increases the danger of contamination caused by the sprocket wheel. As mentioned, such contamination is especially unacceptable in connection with present day quality requirements that must be met by such film material. Similarly, any metal dust caused by wear is very undesirable also in connection with magnetic tape films and photographic carrier films because the quality of such films is impaired by the metal dust.

Another substantial disadvantage of a sprocket wheel drive with large diameter wheels is seen in the substantial structural and engineering efforts combined with the high manufacturing costs required for meeting the high precision requirements that must be met by such devices in operation.

OBJECTS OF THE INVENTION

In view of the foregoing, it is the aim of the invention to achieve the following objects singly or in combination:

to construct a guide track for a tentering chain in such a way that the disadvantages resulting from the size and weight of the drive sprocket wheel are avoided;

to substantially increase the adjustment range of the spacing between the two tentering chains, more specifically, between the two forward runs of the tentering chain track;

to provide an easy accessibility to all points of the system for maintenance personnel;

to use a sprocket drive wheel having a substantially smaller diameter while still providing a smooth run; and to avoid a contamination or dirtying of the goods, such as fabrics or films, by the lubricating medium and/or by any metal dust resulting from wear and tear.

SUMMARY OF THE INVENTION

According to the invention, there is provided a guide track for a tentering chain in which the lead-in end is located upstream of the discharge end, as viewed in the travel direction of the material being treated, whereby the drive sprocket is located in the U-turn at the discharge end of the guide track. The U-turn is divided into two curved or bow-shaped guide sections and a straight guide track section interconnects the two curved sections. The drive sprocket wheel is located with its rotational axis in the center of curvature of one of the curved sections. The curved sections have respective radii of curvature, each of which is smaller than one half of the spacing between the forward and reverse run of the guide track.

By dividing the large U-turn into two curved sections having smaller radii connected by a straight guide track section, the invention makes it possible to use a sprocket drive wheel of substantially smaller diameter for driving the tentering chain. This feature in turn has the advantage that the accessibility to the closing and opening points of the tentering clamps is substantially improved and that the overall structural length of the entire apparatus is somewhat reduced. It has been found that a high precision can be achieved in the apparatus according to the invention with regard to the drive means, especially the drive sprocket, and in the bearing support of the drive sprocket. Yet, surprisingly, the engineering and structural efforts, as well as the cost, have simultaneously been substantially reduced.

An important feature of the invention makes it possible to locate the lubricating points of the sprocket drive wheel near the return run or reverse run of the tentering chain, namely in the partially curved section away from the forward run of the tentering chain. Thus, any location where a contamination source may be present is located away from the outlet end of the apparatus and thus away from the material web or film material, whereby the danger of contamination is avoided.

It is advantageous that the two partial curved guide sections form together a looping angle of 180°, whereby each individual looping angle may differ from the other looping angle. Advantageously, however, each curved section should have a looping angle of 90°, whereby both guide sections may have radii of equal size.

A main advantage is achieved according to the invention in that the straight guide track section between the two curved sections may have different lengths in different track structures simply by keeping intermediate sections of different lengths on hand while maintaining the dimensions of the curved sections and of the drive sprocket wheel unchanged. With this feature it is possible to construct especially a film stretching system with a few standardized structural components having fixed dimensions, except for the intermediate pieces of different lengths, while still providing a substantial adaptability of the apparatus to individually required operational dimensions. Additionally, in any of these modifications it is possible to mount the partially curved sections of the U-turn and the sprocket wheel as well as the straight intermediate section on a common support so that their position may be adjusted in unison in a direction extending across the feed advance direction of the fabric or film web. Thus, the present apparatus is easily adaptable to fabrics and films of different widths.

Moreover, the separation of the U-turn into two curved sections interconnected by a straight section can also be applied at the inlet end of the endless track. In that case, the U-turn of the track will comprise simply a guide bow or curved section instead of the sprocket drive wheel.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
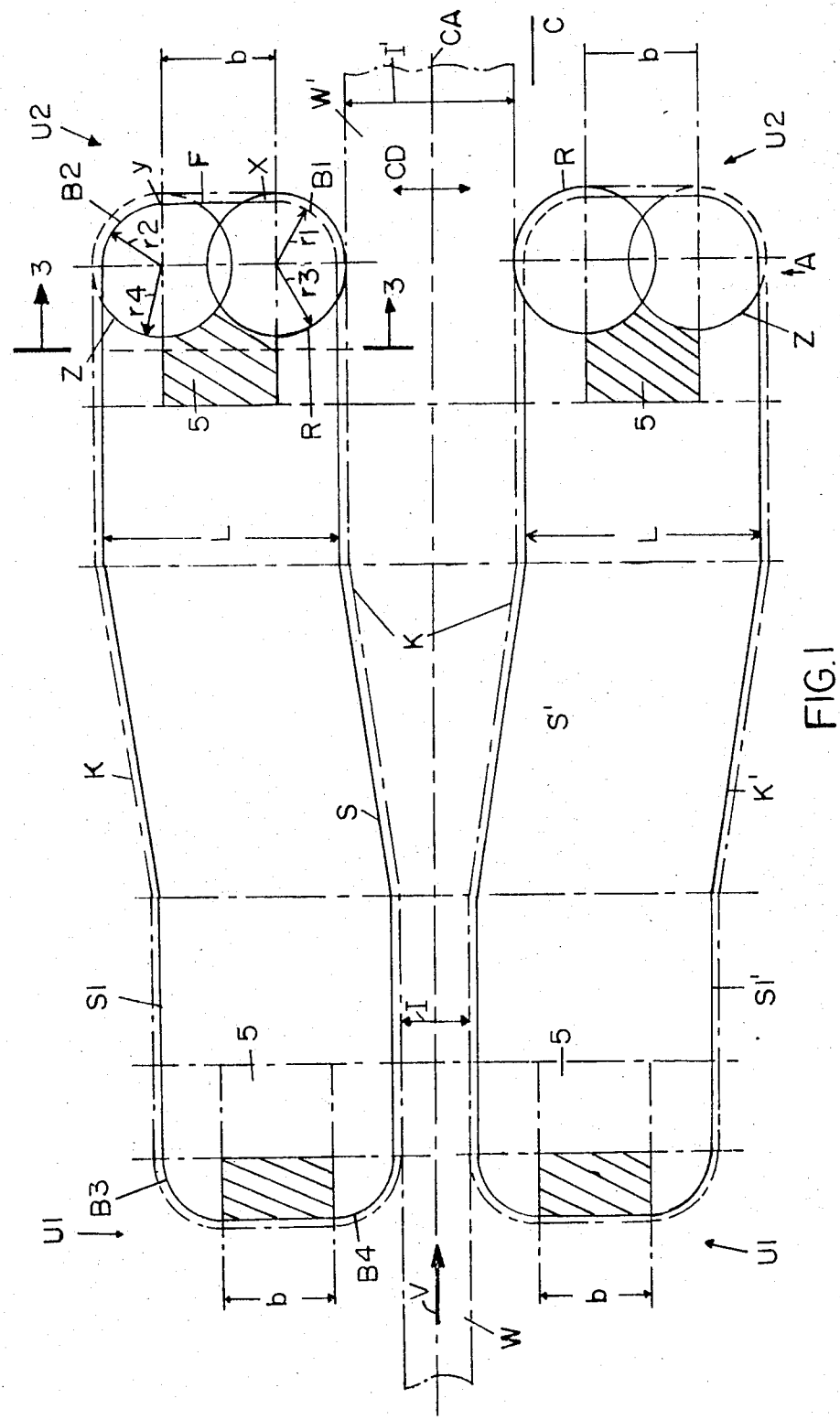
FIG. 1 is a schematic top plan view of two guide tracks forming a pair for guiding two tentering chains used for stretching a material, such as a synthetic material film, in a direction extending across the feed advance direction.

The schematic illustration of FIG. 1 shows two guide tracks including rail sections S, S1 and S', S1' respectively. Two tentering chains K and K' run along these guide tracks. The two tracks are mirror-symmetrical relative to a central longitudinal axis CA. A web W of fabric or film or the like, having an initial width I travels in the direction V from an entrance zone shown at the left-hand end to an exit zone shown at the right-hand end of FIG. 1. The two tentering chains K, K' cooperate with each other in stretching the web W from its initial width I to an exit width I'. The tentering chains K, K' pass through different zones separated by vertical dash-dotted lines. These zones and the specific construction of the guide rails including any guide points along the travel path of the tentering chains are conventional and hence not described in detail, besides, they are not part of the invention.

Each guide track has an inwardly located guide rail section S, S' forming a forward run or section along which the tentering chain travels from left to right. On the other hand, the tentering chains K, K' travel from right to left along the outer rail section S1 and S1' forming return or reverse runs. The rail section S is spaced from the rail section S1 by a spacing L. Similarly, the rail section S' is spaced from the rail section S1' by the same spacing L. First U-turns U1 are located at the entrance end of the apparatus. Second U-turns U2 are located at the outlet end of the apparatus. At least the inner rail sections S, S' run through a housing forming a treatment chamber, not shown, to simplify the illustration.

Although in FIG. 1 only one diverging zone is shown in the center of the figure, several diverging and again converging zones may be provided, along with zones in which the rail sections run in parallel. At the beginning of the outlet U-turn U2, the stretched web W' is released by the individual tentering clamps from the tentering chain so that it may be fed onto web take-up rollers or the like, not shown. The opened tentering clamps pass on around the respective U-turn U2 and travel along the rail sections S1, S1' of the return runs of the guide tracks until the opened clamps reach the entrance end for again clamping the web W. The conventional tentering chains K, K' travel with a uniform spacing from all rail sections S, S1, S', S1' of the guide tracks. This is schematically indicated by the dash-dotted line along all the rail sections.

According to the invention, each of the two U-turns U2 at the outlet end of the apparatus comprises two curved sections B1 and B2 each providing a looping angle, for example, of 90°. The two curved or bow sections B1, B2 are interconnected by an intermediate straight guide section F. The first partial guide section B1 provides a guide bow or curve for the tentering clamps while the other guide section B2 represents the tentering clamp guide in the range of the drive sprocket wheel Z meshing conventionally with the links of the tentering chain K, K' or directly with the tentering clamps which are assembled to form the tentering chain. The radius r1 of the curved guide section B1 and the radius r2 of the guide section B2 are advantageously of equal size. However, they do not need to be of equal size.

Depending on the structure of the individual tentering clamps, the drive sprocket wheel Z must have a pitch circle with a radius r4 slightly different from the radius r2 of curvature of the curved guide section B2. The rotational axis of the drive wheel Z is arranged concentrically with the center of curvature of the curved guide section B2. As shown in FIG. 1, the two radii r1 and r2 are each smaller than one half of the spacing L between the forward and reverse runs of the guide rail sections S, S1; S', S1'. With these dimensions or radii, the intermediate straight guide section F will have a length b, whereby expensive sprocket guide wheels with larger diameters are avoided. Such large diameter sprocket wheels would have to correspond to the spacing L. Further, the point where the drive wheel Z begins to mesh with the tentering chain is no longer located at the end of the forward run S, S', but rather at the beginning of the return run S1, S1'. This feature has the advantage that any contamination causing lubrication points and points where wear and tear is large causing dust, are located away from the web W, thereby protecting the web.

Incidentally, an opening device for the tentering clamps is located with its axis concentrically relative to the center of curvature of the first curved guide section B1. Such a device may comprise a clamp opening wheel R having a radius r3 which may be somewhat larger than the radius r1 of curvature of the curved guide section B1. The intermediate straight guide section F extends between the points x and y and has a length b as mentioned above. Point x defines the end of the first curved guide section B1 while point y defines the start of the meshing between the tentering chain K and the drive sprocket Z.

A position adjustable support frame 5 is shown in all four figures. The partial guide sections B1 and B2, the drive sprocket wheel Z, the clamp opening wheel R, and the intermediate guide rail section F are all mounted in common on the adjustable machine frame 5. Thus, by shifting the machine frame 5 in the cross direction CD it is possible to adjust the spacing between the two guide tracks in the direction across the travel direction V and thus in the direction in which the web W must be stretched.

It is not necessary to divide the 180° of the U-turn into angular sections of equal size. Rather, it is possible, for example, to provide the first curved section B1 with an angle larger than 90° and to make the curved section 2 so as to have an angle smaller than 90°, or vice versa. The intermediate guide section F would not extend at a right angle relative to the central axis CA if the curved sections B1, B2 provide looping angles other than 90°. In that case the section F would slant relative to the axis CA.

Depending on the type of conventional tentering chain, it may be necessary to arrange the drive sprocket wheel Z above or below the clamp opening wheel R so that both wheels have rotational axes extending coaxially relative to each other and relative to the first curved guide section B1. However, with regard to the above mentioned danger of contamination, it is preferable to locate the drive sprocket wheel away from the right-hand end of the forward run of the tentering chain as shown in FIG. 1 rather than near the right-hand end of the forward run of the tentering chain.

The first U-turns U1 at the inlet end of the apparatus are constructed in the same fashion as the U-turns U2. Each U-turn U1 comprises two guide rail sections B3 and B4 interconnected with an intermediate straight section also having the length b for example. However, the difference between the U-turn U1 and the U-turn U2 is that the U-turn U1 does not comprise a drive sprocket wheel, but rather two curved sections B3, B4 of equal construction and with an uninterrupted, flexible guide rail. Here again, the division of the 180° U-turn need not be into equal looping angles. However, the curved sections B3 and B4 are also mounted on an adjustable frame member 5 for the above mentioned adjustment in the cross direction CD.

When it becomes necessary to construct machines with different dimensions requiring different lengths of guide rail sections between the inlet and outlet end, no difficulties are encountered because the construction of the U-turn remains the same. Merely the straight intermediate sections F may have to be exchanged against respective sections of different lengths in order to accommodate any modification in the spacing L. This feature of the invention has the substantial advantage that the construction and the maintaining of spare parts is substantially simplified because the rail sections, with the exception of the intermediate sections F, are exchangeable against each other.

Figure 2:
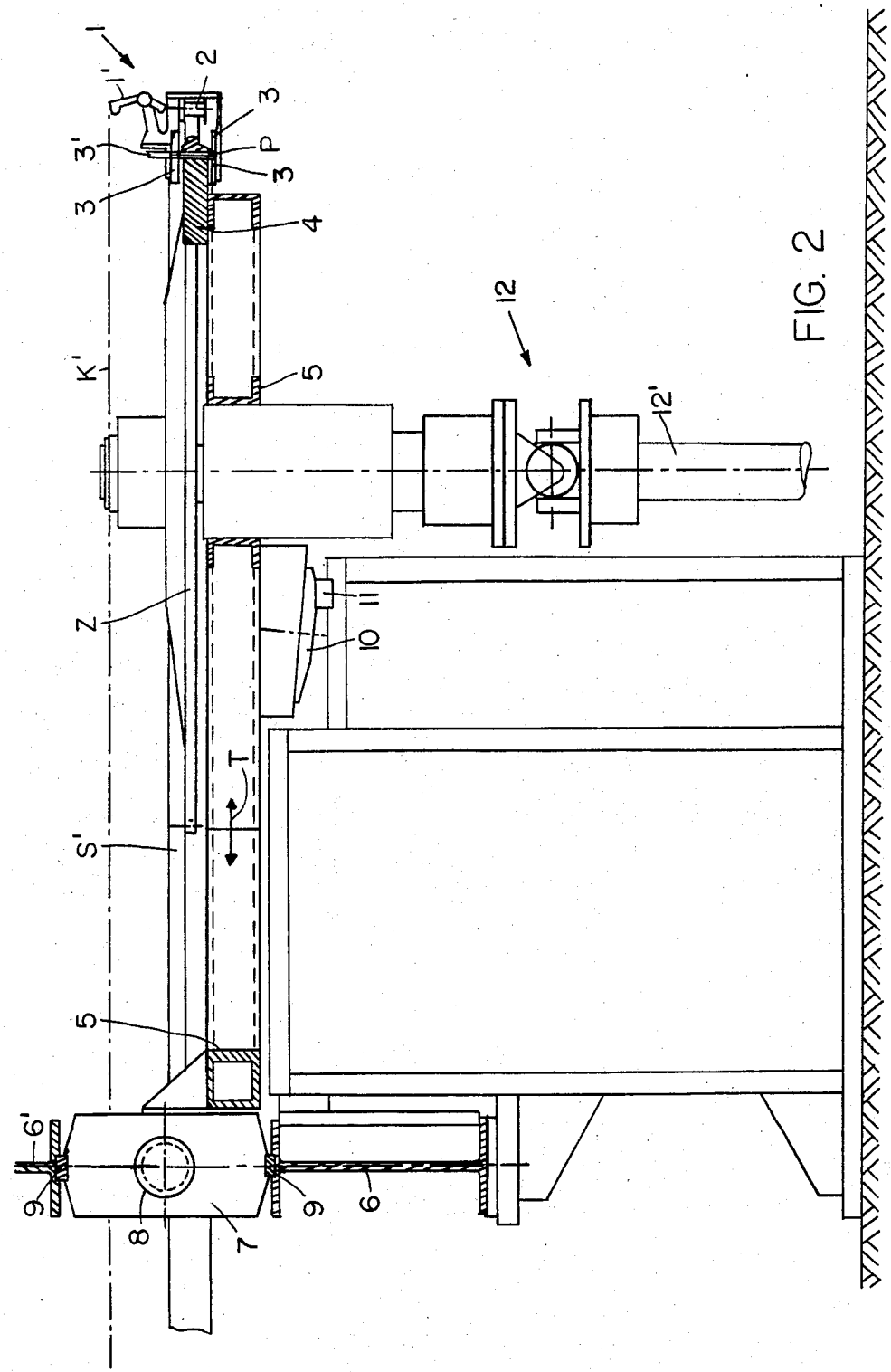
FIG. 2 is a side view in the direction of the arrow A in FIG. 1, partially in section.

The side view of FIG. 2 illustrates, in a somewhat simplified manner, important components of the machine frame and of the drive for the tentering chain. Two cross beams 6, 6' forming part of the stationary machine frame structure support a chain track carrier 7 by means of two guide rods 9. The chain track carrier 7 has a threaded hole through which a threaded spindle 8 extends for the adjustment of the position of the chain track carrier 7 to which the support frame 5 is connected. By rotating the adjustment spindle 8 in one or the other direction, it is possible to move the chain track carrier 7 back and forth in a direction extending perpendicularly to the plane of the sheet of FIG. 2. This adjustability makes it possible to adapt the spacing between the two guide tracks to different web widths and to also vary the stretching ratio for different types of webs W. The above mentioned support frame 5 itself is movably or slidably supported by a slide guide 10 running on a guide rail 11 secured to the machine frame, whereby the support frame 5 with all the components mounted thereon is movable and adjustable in the cross direction CD as mentioned above. In order to permit the just mentioned adjustment, the drive of the drive sprocket wheel Z includes a drive shaft 12' coupled to the wheel Z through a universal joint 12.

In the right-hand portion of FIG. 2, a rail member 4 supported by the support frame 5 is shown in section. A package P of thin spring steel tapes forming the above mentioned rail sections S, S', S1, S1', is inserted into the rail member 4. The package P projects above and below from the rail member 4 so that horizontal guide rollers 3 may properly engage the package P for guiding the tentering clamps 1 in the horizontal direction. The illustration shows only the body of the tentering clamps 1 and the pivotable clamping members or clamping flaps 1'. The body of each tentering clamp 1 is connected to a respective chain link 2 of the tentering chain. By using a total of four horizontal guide rollers 3 as shown, a proper guiding of the tentering clamps 1 in the horizontal direction is assured. However, a further carrier roller 3' extending vertically and having a horizontal rotational axis rides on the upper narrow edge of the package P to support the respective tentering clamp 1 in the vertical direction. The respective guide rail section, for example, S' formed by the package P of spring steel tapes or bands is shown behind the drive sprocket Z. The dash-dotted line extending horizontally in the top portion of FIG. 2 represents the tentering chain K', more specifically, the path of the top of the clamp flap 1'.

Figure 3:
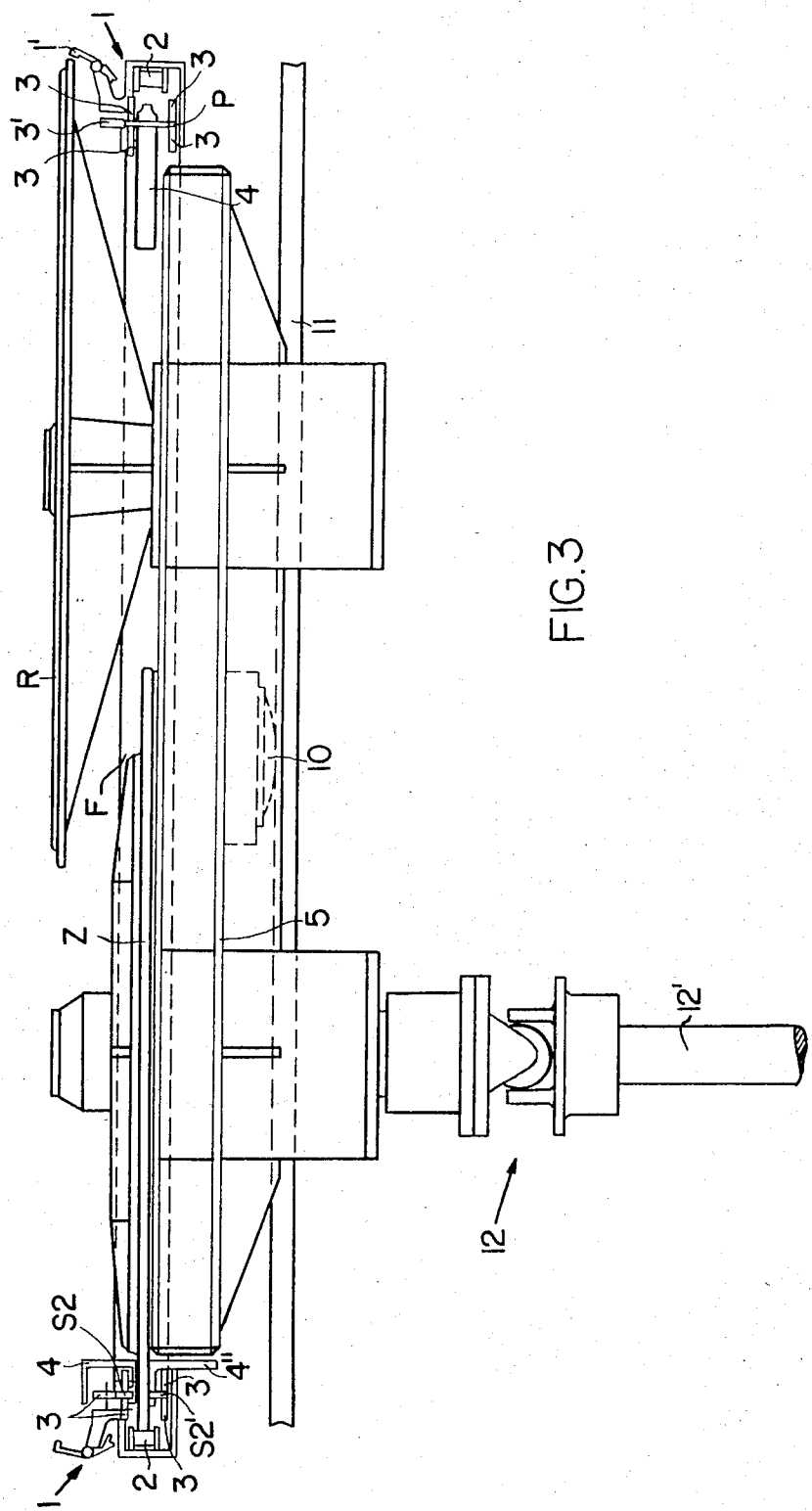
FIG. 3 is a sectional view along the section line 3—3 in FIG. 1.

FIG. 3 shows a different view onto the U-turn U2 from the section plane 3—3 to illustrate the arrangement of the clamp opening wheel R and of the sprocket drive wheel Z on the same support frame 5 which in turn has a sliding guide 10 riding on a rail 11 supported in the machine frame as mentioned above. The straight interimediate rail section F is visible behind the clamp opening wheel R and the drive sprocket wheel Z.

The end of the forward run of the guide rail section for the tentering frame is shown in the right-hand part of FIG. 3. The rail member 4 which itself is attached to the support frame 5, carries the package P of the guide rail as described above with reference to FIG. 2. The edge of the clamp opening wheel R opens the tentering clamp 1 when the flap 1' contacts the edge of the wheel R, thereby flipping the flap 1' into the position shown in FIG. 3 so that the web W is released from the tentering chain. The arrangement and function of the means for opening the tentering clamps 1 do not require any further description, since these features are conventional and of no concern to the gist of the invention. It does not matter whether the clamp opening wheel R is positively driven or whether it is freely rotatable by the advance of the tentering chain. The wheel R may even be replaced by fixed opening rails which push the flaps 1' into the opened position.

At the left-hand end of FIG. 3, the illustration is substantially symmetrical to the illustration at the right-hand end as far as the tentering clamps 1 are concerned. However, the rail carrier along the curved section B2 where the drive sprocket wheel Z meshes with the tentering chain, is somewhat modified in its structure since it comprises an upper carrier rail portion 4' and a lower carrier rail portion 4''. The carrier portion 4' supports a rail section S2 and the lower carrier portion 4'' carries a rail section S2'. Thus, the drive sprocket Z reaches through a gap between the two rail sections S2 and S2' for meshing with a chain link 2. The arrangement must be such that at least one portion of the guide rail extends in a plane parallel to the plane defined by the sprocket wheel Z so that at least this one section continues without any interruption around the meshing zone. In FIG. 3, the example embodiment is illustrated in such a manner that two parallel rail sections S2 and S2' extend around the meshing zone as described. In this manner, the drive sprocket Z merely transports the tentering chain, while the horizontal and vertical forces are taken up by the guide rail sections above and below the wheel Z. This positive guiding of the tentering chain above and below the drive sprocket Z makes sure that adverse shocks on the rollers of the tentering clamps 1 are avoided.

Figure 4:
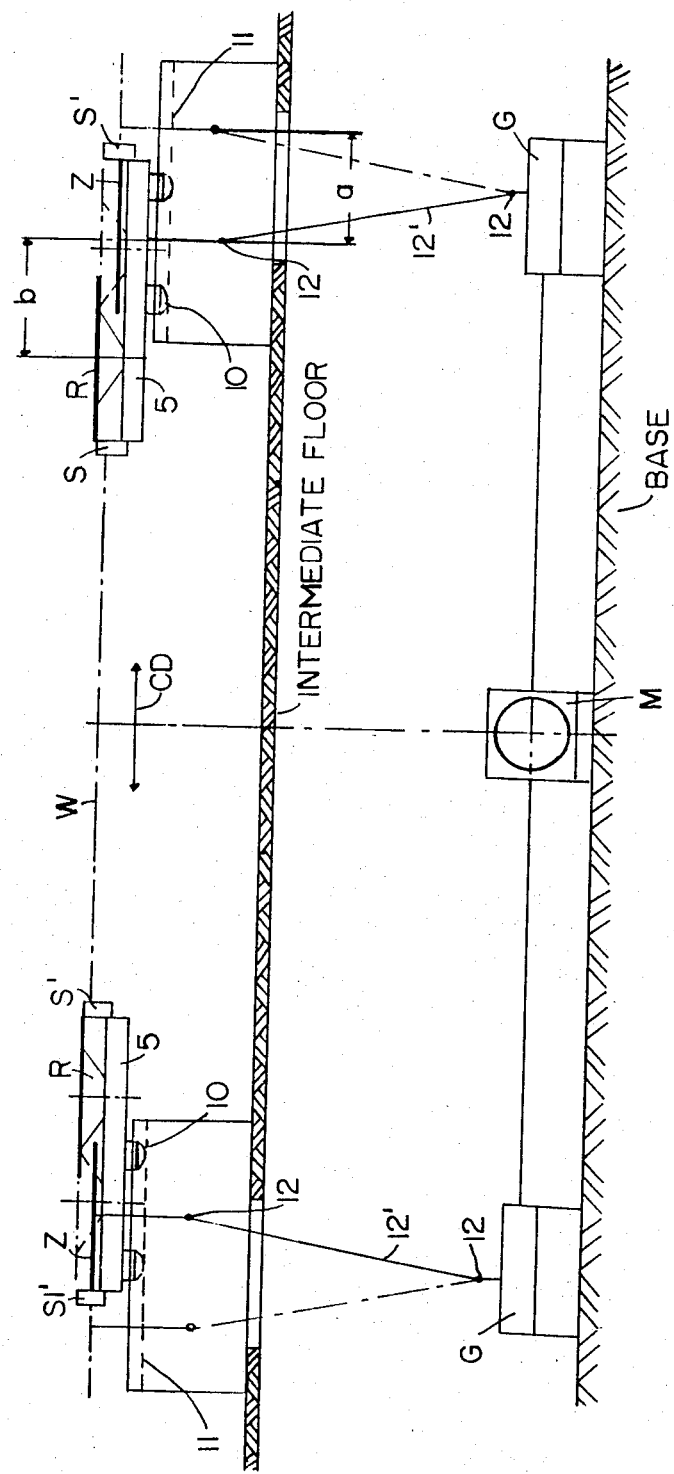
FIG. 4 is a schematic view in the direction of the arrow C in FIG. 1.

FIG. 4 shows somewhat schematically a view into the discharge end of the apparatus as indicated by the arrow C in FIG. 1 for explaining the lateral adjustment of the two guide tracks forming a pair. A motor M and two gear boxes G are mounted in fixed positions on a machine base or first floor. The remaining components of the apparatus are mounted on an intermediate supporting floor and the drive shafts 12' reach from the respective gear box through corresponding openings in the intermediate floor, whereby several universal joints 12 may be employed for transmitting the drive power to the drive sprocket wheels Z. The web W travels toward the viewer. The guide tracks S', S1' and S, S1 are the same as shown in FIG. 1 and extend in an endless manner to form the described inlet and outlet of the apparatus. The support frames 5 carry the opening wheels R and the drive sprockets Z as described. The sprockets Z are arranged at the beginning of the respective return runs S1 and S1'. The support frames 5 slide with their sliding guide 10 along the rails 11 horizontally back and forth in the plane of the drawing of FIG. 4, whereby the horizontal spacing between the inner rail sections S and S' are adjustable. The tentering chains run in synchronism since they are driven by the same motor M through the respective gear boxes G. The full line illustration of the drive shafts 12' illustrate the position with the narrowest spacing between the rail sections S, S' while the dash-dotted positions of the drive shafts 12' indicate the maximum spacing between the rail sections, S, S'. The adjustment range a is shown in the right-hand part of FIG. 4, whereby the holes through the intermediate floor must be of a size sufficient for the adjustment.

The above described features of the invention provide a large degree of freedom in the layout and construction of tentering frames and/or film stretching machines. The advantages of an endless, flexible guide rail are fully maintained even in the U-turns U1 and U2. Simultaneously, it is possible to select the most favorable radius for the curved sections B1, B2 and for the sprocket wheel Z. The sprocket wheel Z may be located in accordance with the special requirements, depending on the individual type of tentering chain. More specifically, the sprocket wheel may be arranged coaxially with the clamp opening wheel R at the end of the forward run or it may be arranged coaxially with the curved section B2 at the beginning of the return or reverse run.

In this manner, the invention assures an initial, partial direction reversal of the tentering chain and its track at the outlet end of the machine. This initial, partial direction reversal has a relatively large radius and permits guiding the tentering chain into an intermediate rail section F leading into the second partial reversal by the curved section B2. The drive sprocket Z is preferably located in the looping range of the second partial reversal at the end of which the tentering chain enters into its reverse run.

Due to the uninterrupted or endless guide track according to the invention, the tentering chain is positively guided even in the U-turn or direction reversing zones U1, U2 because the guide sections are sufficiently flexible so that a continuous guiding of the tentering chain is assured without exposing the tentering chain to any shocks along the entire length of the apparatus. These features in combination assure a high production speed in the range of about 200 to about 450 meters per minute while simultaneously avoiding the application of excessive loads to the bearings. As a result, the present machines not only have high productions rates, they also have long productive lives. Even the transfer from the drive sprocket Z into the rail section and vice versa takes place without any undue stress on the components involved and without any shocks.

Due to the exchangeability of the intermediate guide section F between the partial curved sections B1 and B2 it is possible to vary the spacing L between the inner and outer rail sections, that is between the forward and reverse runs so as to adapt this spacing to any individual requirements. A web lubrication, any dust caused by wear and tear, and any resulting contaminations or dirtying of the web W are avoided by locating the lubrication points and points of wear and tear away from the location where the web W passes through the machine. The opening of the tentering clamps 1 is achieved simultaneously with the aid of the clamp opening wheel R which is preferably freely rotatable and which has a relatively large diameter so that the wheel R may be arranged outside of the path through which the web W passes, that is, behind the tentering clamps 1. The spacing of the point where a clamp is opened to the point where a clamp starts its reverse run is substantially smaller than has been possible heretofore. Thus, a proper release of the web W from the tentering chains is assured, and the operator has a better access to the web W. The drive system itself can now be simpler than heretofore as shown in FIG. 4.

The present features also permit locating the reverse run of the tentering chain outside of the housing of the treatment chamber, thereby providing an improved accessibility and facilitating the cooling of the tentering chain. Additionally, the total structural width of the apparatus is easily adaptable to the space limitations set by the customer. Such adaptation is primarily possible due to the selection of different lengths for the intermediate rail sections F.

Further, the basic geometry or layout of the present tentering chain guide tracks may be the same at both U-turns U1 and U2.

Thus, the same advantages are achieved at the inlet end of the machine as have been described above for the outlet end of the machine. The inlet U-turn will normally not include a drive sprocket. The guide roller for the web W closest to the closing point of the tentering clamps 1 can now be located even closer to the just mentioned closing point than was possible heretofore. As a result, the operator has better access to this critical inlet point where the clamps close to secure the web W to the tentering chains. Further, the entire length of the machine has been somewhat reduced, and its operability has been substantially improved due to the above described features and advantages.

Incidentally, intermediate rail sections F of different lengths can be used provided the spacing between rotational axes of the sprocket wheel Z and of the clamp opening wheel R can be adjusted accordingly. Such adjustment is possible, for example, by making the support frame 5 as a telescoping member as symbolically indicated by the double arrow T in FIG. 2. Another possibility would be to make the position of the mounting bearing of either the sprocket wheel Z or of the wheel R adjustable, for example, in a longitudinal mounting slot in the support frame 5.

Although the invention has been described with reference to specific example embodiments, it will be appreciated, that it is intended to cover all modifications and equivalents within the scope of the appended claims.

What I claim is:

1. A guide track for a tentering chain carrying a plurality of tentering members supported by rollers on the guide track, comprising a plurality of guide rail sections forming a forward run, a reverse run, and intermediate runs forming U-turns interconnecting said forward and reverse runs for forming an endless guide track, drive sprocket means operatively arranged in one of said U-turns between said forward and reverse runs for meshing with said tentering chain, said one U-turn in which said drive sprocket means are located comprising a straight guide rail section having a given length and two curved guide rail sections each having a given radius of curvature, said straight guide rail section being arranged between said two curved guide rail sections, said drive sprocket means being arranged coaxially with one of said curved guide rail sections, both of said radii of curvature of said two curved guide rail sections being equal to each other and each of said radii of curvature being smaller than one half of a spacing between said forward and reverse runs of said guide track, wherein each of said two curved guide rail sections forms a 90° looping angle, said both curved guide rail sections together form a complete 180° U-turn.

2. The guide track of claim 1, wherein said straight guide rail section having a given length between said two curved guide rail sections is exchangeable by a similar straight guide rail section having a different length for varying the length of the respective U-turn.

3. The guide track of claim 2, further comprising support means for mounting said two curved guide rail sections on said support means at different spacings from each other, said different spacings relating to said different lengths of said straight guide rail sections.

4. The guide track of claim 1, wherein said drive sprocket means is mounted coaxially with a center of curvature of that curved guide rail section which leads into said return run.

5. The guide track of claim 1, further comprising clamp opening means operatively arranged at an outlet end of said forward run of said guide track.

6. The guide track of claim 5, wherein said clamp opening means comprise a clamp opening wheel mounted coaxially with that curved guide rail section which leads out of said forward run of said guide track.

7. The guide track of claim 1, further comprising clamp opening means, support means, and means mounting said two curved guide rail sections, said drive sprocket means, said clamp opening means, and said straight guide rail section on said support means, said guide track further comprising adjustment means operatively connected to said support means for adjusting the position of said support means back and forth in a direction extending perpendicularly to a forward movement direction of said tentering chain, whereby all components mounted on said support means are adjustable in unison with the adjustment of said support means.

8. The guide track of claim 1, wherein one of said two curved guide rail sections is located in a zone of said drive sprocket means, said one curved guide rail section having two portions forming a gap therebetween, said drive sprocket means reaching through said gap for meshing with said tentering chain, said two portions being curved and merging uninterrupted into said guide track before and after said gap.

9. The guide track of claim 1, wherein the other of said U-turns also comprises two curved rail sections and a straight guide rail section intermediate said other two curved rail sections.

10. A guide track for a tentering chain carrying a plurality of tentering members supported by rollers on the guide track, comprising a plurality of guide rail sections forming a forward run, a reverse run, and intermediate runs forming U-turns interconnecting said forward and reverse runs for forming an endless guide track, drive sprocket means operatively arranged in one of said U-turns between said forward and reverse runs for meshing with said tentering chain, said one U-turn in which said drive sprocket means are located comprising a straight guide rail section and two curved guide rail sections each having a given radius of curvature, means for mounting said two curved guide rail sections at different spacings from each other, said straight guide rail section being arranged between said two curved guide rail sections, said drive sprocket means being arranged coaxially with one of said curved guide rail sections, each of said radii of curvature being smaller than one half of a spacing between said forward and reverse runs of said guide track, said straight guide rail section having a given length between said two curved guide rail sections corresponding to one of said different spacings, whereby said straight guide rail section is exchangeable by a similar straight guide rail section having a different length for varying the length of the respective U-turn, and wherein said different spacings relate to said different lengths of said straight guide rail sections.

11. The guide track of claim 10, wherein said two curved guide rail sections together form a complete 180° U-turn.

12. The guide track of claim 11, wherein each of said two curved guide rail sections forms a 90° looping angle in said U-turn.

13. The guide track of claim 10, wherein said radii of said two curved guide rail sections are equal to each other.

14. The guide track of claim 10, wherein said drive sprocket means is mounted coaxially with a center of curvature of that curved guide rail section which leads into said return run.

15. The guide track of claim 10, further comprising clamp opening means operatively arranged at an outlet end of said forward run of said guide track.

16. The guide track of claim 15, wherein said clamp opening means comprise a clamp opening wheel mounted coaxially with that curved guide rail section which leads out of said forward run of said guide track.

17. The guide track of claim 10, further comprising clamp opening means and support means, said mounting means mounting said two curved guide rail sections, said drive sprocket means, said clamp opening means, and said straight guide rail section on said support means, said guide track further comprising adjustment means operatively connected to said support means for adjusting the position of said support means back and forth in a direction extending perpendicular to a forward movement direction of said tentering chain, whereby all components mounted on said support means are adjustable in unison with the adjustment of said support means.

18. The guide track of claim 10, wherein one of said two curved guide rail sections is located in a zone of said drive sprocket means, said one curved guide rail section having two portions forming a gap therebetween, said drive sprocket means reaching through said gap for meshing with said tentering chain, said two portions being curved and merging uninterrupted into said guide track before and after said gap.

19. The guide track of claim 10, wherein the other of said U-turns also comprises two curved rail sections and a straight guide rail section intermediate said other two curved rail sections.

* * * * *